Oct. 24, 1961　　　　H. K. TRUNNELL　　　　3,005,620
　　　　　　　　　　　　WIRE FEEDER
Filed Feb. 21, 1958　　　　　　　　　　　　2 Sheets-Sheet 1
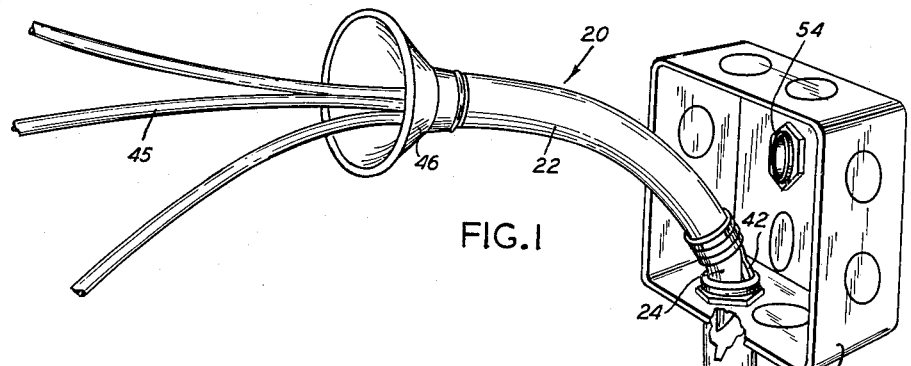
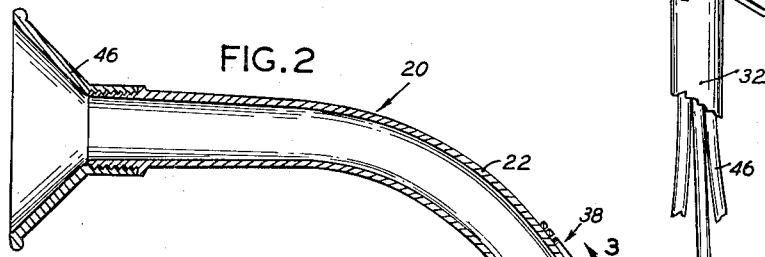
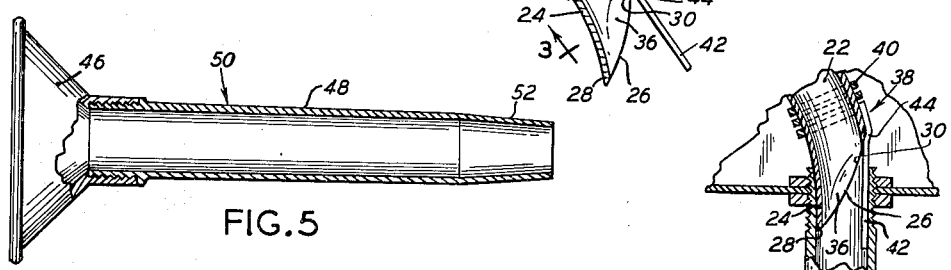
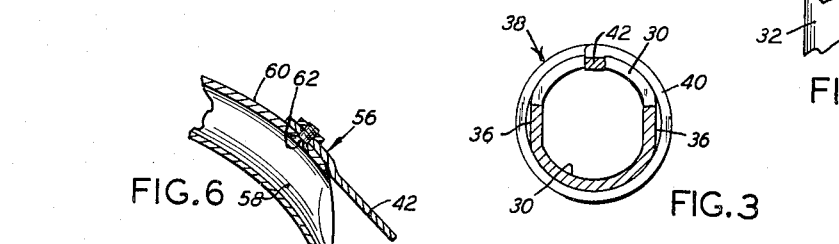
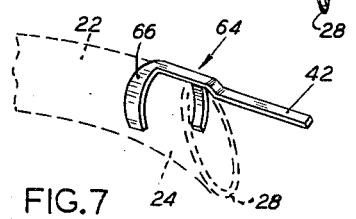
*INVENTOR.*
HAROLD K. TRUNNELL
*BY*
BUCKHORN, CHEATHAM & BLORE
*ATTORNEYS*

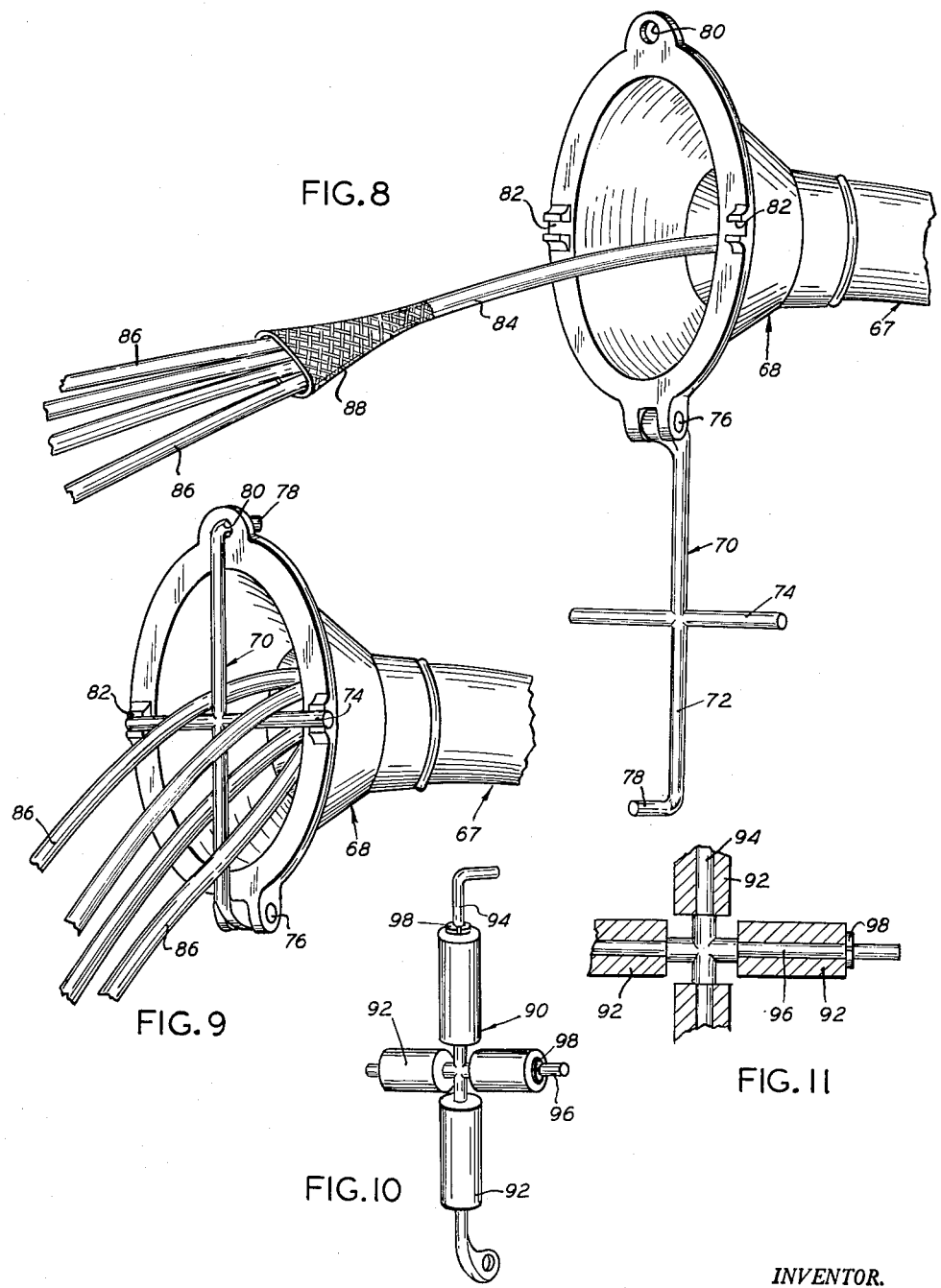

United States Patent Office 3,005,620
Patented Oct. 24, 1961

3,005,620
WIRE FEEDER
Harold K. Trunnell, 3195 Meadow Lane, Eugene, Oreg.
Filed Feb. 21, 1958, Ser. No. 716,693
10 Claims. (Cl. 254—134.3)

This invention relates to a wire feeder and more particularly to a wire guiding device which is adapted to have one end thereof inserted into the open end of a conduit for electric wires and which will remain securely in position during guiding of wires into the conduit and which also may have a novel wire separating structure at its entrance end for preventing twisting of the various wires about each other during the entrance of the wires into the conduit.

Wire feeders or wire guiding devices of various types have been suggested and have been employed to a limited extent in the prior art for assisting in guiding wires being pulled into the entrance of the conduit. Certain of such wire feeding devices have included a curved tubular member with a bell at the entrance end and with the other end cut at an angle and reduced in size to provide for wedging such end of such device into the open end of the conduit into which the wires are to be pulled. Such devices have depended entirely upon frictional engagement of such other end of the tubular member with the interior surfaces of the end of the conduit for holding the wire feeder in place. This has not been entirely effective for holding the wirt feeder in place and has required that the wire feeder be repeatedly repositioned in the end of the conduit during pulling of the wires. When a single workman has attempted to employ such a wire feeder, he has had to make frequent trips between the entrance end of the conduit and the exit end thereof. The result has been that two workmen were required to efficiently pull the wires into the conduit even if a wire feeder was employed.

In accordance with the present invention, the end of the wire feeder which enters the open end of the conduit is provided with a spring member having an element adapted to be inserted along with the end of the wire feeder into the entrance end of the conduit. Such spring element engages the inner surface of the conduit to hold the wire feeder securely in place. The spring member of the present invention can be employed with the wire feeders of the prior art which included a reduced end for insertion into the conduit. The wire feeder of the present invention, however, preferably has its end which is inserted into the conduit of the same external diameter as the conduit in order to provide an internal guiding opening of increased size. By slightly flattening such end in conjunction with cutting it at an angle, such end is insertable into the end of the conduit with the spring member above referred to in position on the wire feeder.

Also, when several wires are being pulled into a conduit, they frequently become crossed or twisted in the conduit so as to impede movement of the wires through the conduit. In accordance with the present invention, the entrance bell of the wire feeder may be provided with a wire separating member which may be selectively placed in operative position or removed from operative position. The wires may be initially started into the wire feeder after being joined to a pulling tape or fish wire when the separating member is in inoperative position, after which the wires may be separated from each other and the separating member moved to operative position on the open end of the entrance bell to provide separate feed apertures for the various wires. This effectively prevents twisting of the wires during feeding of the wires into the conduit.

In the various modifications of the present invention, an entrance bell member which is detachably secured to the tubular portion of a wire feeder is preferably employed. Thus the bell members of the present invention may be employed upon any type of wire feeder including those having straight tubes for inserting into conduits in the back of a junction box or curved tubes for insertion into conduits extending from the side of a junction box and, in some cases, a single sized bell member may be employed with two or more different sized tubular portions for different sized conduit.

It is therefore an object of the invention to provide an improved wire feeder for inserting into the open end of a conduit in which provision is made for more securely retaining the wire feeder in the end of such conduit.

Another object of the invention is to provide a wire feeder, in which the end to be inserted into a conduit is cut at an angle and in which a spring member has an element entering the conduit through a portion of the slant opening thereby provided to hold the feeder in position in the end of the conduit.

Another object of the invention is to provide an improved wire feeder which provides an opening therethrough of larger diameter than wire feeders of the prior art for a conduit of given size and which may be inserted into and securely held in the end of a conduit.

Another object of the invention is to provide a wire feeder having a bell member detachably secured thereto so that such bell member may be employed with a plurality of different shaped and different sized tubular body members.

A further object of the invention is to provide an improved wire feeding device in which provision is made for maintaining the wires entering the wire feeder separated from each other to prevent twisting of such wires.

Another object of the invention is to provide a wire feeding device having a wire separator at the entrance end which may be placed in operative position after the ends of the wires have been initially pulled into the wire feeder.

Other objects and advantages of the invention will appear in the following description of preferred embodiments thereof shown in the attached drawings of which:

FIG. 1 is a perspective view of a wire feeder in accordance with the present invention shown as having one of its ends inserted into a conduit through which wires are to be pulled;

FIG. 2 is a longitudinal vertical section through the wire feeder of FIG. 1;

FIG. 3 is an inclined transverse section on an enlarged scale through an end of the wire feeder of FIG. 2 and taken on the line 3—3 of FIG. 2;

FIG. 4 is a fragmentary vertical section showing the end of the wire feeder of FIG. 2 inserted in a conduit;

FIG. 5 is a view partly in side elevation and partly in longitudinal vertical section, showing the wire feeding bell member of the device of FIG. 2 in position upon a wire feeding device having a straight body member;

FIG. 6 is a fragmentary longitudinal vertical section through an end of a wire feeder device showing a modified spring member;

FIG .7 is a perspective view of a further modified type of spring member shown in position upon the end of a wire feeder;

FIG. 8 is a perspective view of a wire feeder having a modified type of entrance bell provided with a wire separating member shown in inoperative position;

FIG. 9 is a view similar to FIG. 8 showing the wire separating member of FIG. 8 in operative position;

FIG. 10 is a perspective view showing a modified type of wire separating member; and FIG. 11 is a fragmentary vertical sectional view through the wire separating member of FIG. 10 showing one manner of mounting rollers thereon.

Referring more particularly to the drawings, one type of wire feeder 20 is shown in FIGS. 1 to 4, inclusive. Such feeder includes a body member 22 in the form of a longitudinally curved tube having one end 24 cut at an angle so as to provide end surfaces 26 which extend at an acute angle to the center line or longitudinal axis of the tubular body member 22. This provides a pointed portion 28 at one side of the body member and an opening 30 in the end of the body member which extends rearwardly of the body member from the pointed end 28 along the other side of the body member. In the preferred construction, the pointed portion 28 is on the side of the body member which is nearest the center of longitudinal curvature of the body member, whereas the opening 30 extends back along the side of the body member farthest from such center of curvature. The end 24 of the body member 22 is adapted to be inserted into a conduit 32 extending through a side wall of a junction box 34. Preferably, the outer diameter of the tubular body member 22 is the same as the outer diameter of the conduit 32 and in order to enable the end 24 thereof to be inserted into the conduit, it is slightly flattened as indicated at 36. This reduces the outer dimension of the end 24 in one lateral direction and in conjunction with the angularly disposed end surfaces 26 enables the end 24 of the body member to be inserted into the end of the conduit 32.

As shown most clearly in FIG. 4, the opening 30 in the end 24 of the body member extends rearwardly from the pointed portion 28 a sufficient distance when the end 24 of the body member is inserted into the end of the conduit, that the rearward portion of such opening is exposed adjacent the end of the conduit 32. A spring member 38 has a portion 40 coiled about the body member adjacent the end 24 and has an elongated element 42 projecting from a position adjacent the rearward portion of the slant opening 30. The elongated spring element 42 diverges from the opposite wall of the body member forming the pointed portion 28. Such elongated spring element 42 is preferably of greater length than the pointed portion 28 of the body member 22 and it will be apparent that the spring element 42 can be first inserted into the open end of the conduit 32 and that the pointed end 28 of the body member may thereafter be inserted into the open end of the conduit. The elongated spring element 42 is compressed toward the pointed portion 28 so as to exert spring pressure against the inner wall of the conduit 32. Preferably the element 42 has a return bend 44 joining it to the coil portion 40 so that it may have its rearward end in alignment with the wall of the body member 22 adjacent the rear part of the opening 30. In the curved body member shown in FIG. 2, the elongated spring element 42 may extend substantially tangential of the curved side wall of the body member opposite the pointed portion 28. Upon being inserted into the open end of the conduit 32, the wire guiding feeder 20 is held securely in position during pulling of the one or more wires 45 through the wire feeder into the conduit.

The other end of the wire feeder 20 is preferably provided with a detachable bell member 46. Thus such bell 46 may be screw-threaded upon such other end of the body member 22. Such bell member may be removed from the curved body member 22 and applied to a straight body member 48 of a wire feeder 50. The straight body member 48 of the feeder 50 is shown as having a reduced frusto-conical end 52 merely to illustrate that the removable bell members of the present invention may be applied to other types of feeder body members. It is apparent, however, that wire feeders having straight body members may be provided with an end such as the end 24 of the wire feeder of FIG. 2 having end surfaces extending in angle and also may be provided with a spring member having an elongated element diverging from the resulting pointed portion of the body member.

A modified type of spring member 56 is shown in FIG. 6. Such spring member may have a portion secured to the end 58 of a modified type of wire feeder body member 60 by a screw and nut 62. The spring member 56 of FIG. 6 has an elongated element 42 which may be the same as the elongated element 42 of FIG. 2 and which may serve the same purpose.

A still further modified form of spring member 64 is shown in FIG. 7. Such spring member 64 has a pair of spring clip portions 66 embracing the end 24 of a body member 22 which may be entirely similar to the body member 22 of FIG. 2. The spring member 64 of FIG. 7 may also have an elongated element 42 occupying the same position as the element 42 in FIG. 2 and serving the same purpose.

A modified type of wire guiding bell member 68 is shown in FIGS. 8 and 9. Such modified bell member is provided with a wire separating member 70 consisting of two cross bars 72 and 74 intersecting and secured together at their central portions. One end of the cross bar 72 is hinged to the peripheral edge of the bell member 68 by a pivot 76 and has its other end provided with a right angularly bent portion 78 which may be received in an aperture 80 on the peripheral edge of the bell member diametrically opposite the pivot 76. The ends of the cross bar 74 may also be received in notches 82 spaced ninety degrees about the periphery of the bell 68 from the pivot 76. It will be apparent that the wire separating member 70 may be pivoted about the pivot 76 between the inoperative position shown in FIG. 8 and the wire guiding position shown in FIG. 9. In the operative position of FIG. 9, the ends of the cross bars 72 and 74 are securely held in position in front of the entrance opening in the bell member.

The wire separating member 70 of FIGS. 8 and 9 is particularly useful when several heavy wires are being drawn into a conduit. After a pulling tape or fish wire 84 has been threaded through the conduit, and through the wire feeder 67, and with the wire separating member in the inoperative position of FIG. 8, a plurality of wires 86 may have their ends secured to the fish wire 84 in any suitable manner, such as by the flexible gripper 88. The ends of the wires 86 are first pulled into the wire guide 67 and then the wire separating member 70 is moved to the position shown in FIG. 9 with the various wires 86 each in its individual guiding opening provided by the open end of the bell member 68 and the cross members of the wire separating member 70. It will be apparent that upon further pulling of the wires, the wires are maintained separate and prevented from twisting about each other when being pulled into the conduit.

A modified form of wire separating member 90 is shown in FIGS. 10 and 11 in which rollers 92 are mounted on the cross arms 94 and 96 of such wire separating member to serve as antifriction guiding elements for the wires 86 of FIGS. 8 and 9. The rollers 92 of FIGS. 10 and 11 may be journaled upon reduced portions of the cross arms 94 and 96 and held in position thereon by spring rings 98. It will be apparent that the bell member 68 with either modification of a wire separating member 70 or 90 may be employed with any type of body member, such as the body members 22 and 48 of FIGS. 2 and 5, to provide any desired type of wire feeder.

The wire feeders of the present invention may be made in several different sizes to fit the various size conduits and, in general, one size bell member 46 or 68 will serve for two or more sizes of body members 22 or 48. Also, in general, the type of bell member 68 shown in FIGS. 8 and 9 having a wire separating member 70 or the wire separating member 90 will be employed for large sized wire guides and in sizes adapted for larger conduits into which a plurality of heavy wires are to be pulled.

The operation of the devices of the present invention are believed to be apparent from the above description. Either before or after the pulling tape or fish wire has been positioned in the conduit, the end of the body member of a wire feeder is inserted into the open end of the conduit into which a wire or plurality of wires is to be pulled. With a body member having a slant cut end, such as shown in FIGS. 1 to 4, 6 and 7 and a spring member such as the spring members 38, 56 or 64, the spring element 42 is first inserted into the open end of the conduit and then the pointed end of the body portion of the wire guide positioned in the end of the conduit. The gripping action produced by the spring element 42 in conjunction with the pointed end 28 of the body member of the wire feeder holds the wire feeder securely in position in the conduit so that such wire feeder requires no further attention after once being positioned in the conduit. In other words, a single workman may position the wire feeder and then pull from the other end of the conduit without requiring a helper to feed the wires into the conduit and without the wire feeder being displaced from the conduit. Particularly for pulling a plurality of heavy wires into a conduit, the structure of FIGS. 8 and 9 prevents twisting of the heavy wires and the rollers 92 of FIGS. 10 and 11 reduce the frictional load and prevent damage to heavy wires. One advantage of the wire separating members of FIGS. 8 to 11 is that connection to the pulling tape can first be made and the wire separating members 70 or 90 thereafter interleaved between the wires and placed in operative position. After the wire pulling operation is completed, the wire feeders of the present invention are easily removed from the conduits.

While I have disclosed preferred embodiments of my invention, it is to be understood that the details thereof may be varied and that the scope of the invention is to be determined by the following claims.

I claim:

1. A wire feeder for guiding wires into a conduit, said feeder comprising a tubular body member terminating at one end in an end surface extending at an acute angle to the central axis of said body member to provide a pointed portion at one side of said end of said body member and an opening at said end of said body member extending rearwardly from said pointed portion and along the opposite side of said body member, a spring member attached to said body member and having a portion extending forwardly of said body member from said opposite side of said body member, said portion extending substantially in alignment with a portion of the wall forming said tubular body member.

2. A wire feeder for guiding wires into a conduit, said feeder comprising a tubular body member terminating at one end in an end surface extending at an acute angle to the central axis of said body member to provide a pointed portion at one side of said end of said body member and an opening at said end of said body member extending rearwardly from said pointed portion and along the opposite side of said body member, a spring member attached to the outer surface of said body member and having a portion extending forwardly from said opposite side of said body member and diverging from said one side of said body member, said portion extending substantially in alignment with a portion of the wall forming said tubular body member.

3. A wire feeder for guiding wires into a conduit, said feeder comprising a tubular body member terminating at one end in an end surface extending at an acute angle to the central axis of said body member to provide a pointed portion at one side of said end of said body member and an opening extending rearwardly of said body member from said pointed portion and along the opposite side of said body member, a spring member attached to the outer surface of said body member and having an elongated spring element extending substantially in alignment with a portion of the wall forming said tubular body member and then forwardly of said body member in a direction diverging from said one side of said body member.

4. A wire feeder for guiding wires into a conduit, said feeder comprising a tubular body member terminating at one end in an end surface extending at an acute angle to the central axis of said body member to provide a pointed portion at one side of said end of said body member and an opening at said end of said body member extending rearwardly from said pointed portion and along the opposite side of said body member, said body member being curved and said one side being the side nearest the center of curvature of said body member, a spring member attached to said body member and having an elongated element extending forwardly from said opposite side of said body member from a point adjacent the rearward portion of said opening, said elongated portion extending substantially tangentially of said opposite side so as to diverge from said one side of said body member.

5. A wire feeder for guiding wires into a conduit, said feeder comprising a tubular body member terminating at one end in an end surface extending at an acute angle to the central axis of said body member to provide a pointed portion at one side of said end of said body member and an opening at said end of said body member extending rearwardly from said pointed portion and along the opposite side of said body member, a spring member attached to said body member and having an elongated portion extending substantially in alignment with a portion of the wall forming said tubular body member, forwardly from said opposite side of said body member, said body member having a bell at its other end for guiding wires into said tube, said bell being detachably secured to said other end of said body member.

6. A wire feeder for guiding wires into a conduit, said feeder comprising a tubular body member terminating at one end in an end surface extending at an acute angle to the central axis of said body member to provide a pointed portion at one side of said end of said body member and an opening at said end of said body member extending rearwardly from said pointed portion and along the opposite side of said body member, a spring member attached to said body member and having a portion extending forwardly from said opposite side of said body member from a position adjacent the rearward portion of said opening and diverging from said one side of said body member, said body member having a bell member detachably secured to its other end for guiding wires into said body member, and a wire guiding member having guide elements positioned in front of said bell member to provide a plurality of separate entrance apertures into said bell member.

7. A wire feeder for guiding wires into a conduit, said feeder comprising a tubular body member terminating at one end in an end surface extending at an acute angle to the central axis of said body member to provide a pointed portion at one side of said end of said body member and an opening at said end of said body member extending rearwardly from said pointed portion and along the opposite side of said body member, a spring member attached to said body member and having a portion extending forwardly of said body member from said opposite side of said body member from a position adjacent the rearward portion of said opening, said body member having a bell member at its other end for guiding wires into said body member, a cross member having arms positioned in front of said bell member to form a plurality of separate entrance apertures into said bell member, one of said arms being pivoted to the periphery of said bell to provide for pivoting said cross member away from the front of said bell.

8. A wire feeder for guiding wires into a conduit, said guide comprising a tubular body member terminating at one end in an end surface extending at an acute angle to the central axis of said body member to provide a pointed portion at one side of said end of said body member and an opening at said end of said body member extending rearwardly from said pointed portion and along the opposite side of said body member, a spring member attached to said body member and having an elongated portion extending forwardly from said opposite side of said body member, said body member having a bell member at its other end for guiding wires into said body member, and a cross member having arms positioned in front of said bell member to form a plurality of separate wire guiding apertures, said arms having guide rollers journaled thereon.

9. A wire feeder for guiding wires into a conduit, said feeder comprising a tubular body member terminating at one end in a portion fitting within the end of a tubular conduit, and a resilient element secured to said end of said body member, and having a portion frictionally engaging the inner surface of said conduit to assist in holding said end of said body member in said conduit, said portion being substantially in alignment with a portion of the wall forming said tubular body member when frictionally engaging said surface.

10. A wire feeder for guiding wires into a conduit, said feeder comprising a tubular body member terminating at one end in a portion fitting within the end of a tubular conduit, said end of said body member having a cut away portion, and a spring member carried by said body member and having a portion extending into said conduit through said cut away portion and frictionally engaging the inner surface of said conduit to assist in holding said end of said body portion in said conduit, said portion being substantially in alignment with a portion of the wall forming said tubular body member when frictionally engaging said surface.

References Cited in the file of this patent

UNITED STATES PATENTS

| | | |
|---|---|---|
| 167,548 | Lilley | Sept. 7, 1875 |
| 1,812,961 | Kent | July 7, 1931 |
| 2,047,242 | Young | July 14, 1936 |
| 2,360,485 | Foster et al. | Oct. 17, 1944 |
| 2,515,724 | McCroskey | July 18, 1950 |
| 2,746,716 | Zachary | May 22, 1956 |
| 2,762,606 | Morse | Sept. 11, 1956 |
| 2,838,280 | Eyles | June 10, 1958 |